July 30, 1968   G. J. LEHR ET AL   3,394,512
MULTIPLE SHEET GLAZING UNIT
Filed Dec. 30, 1965
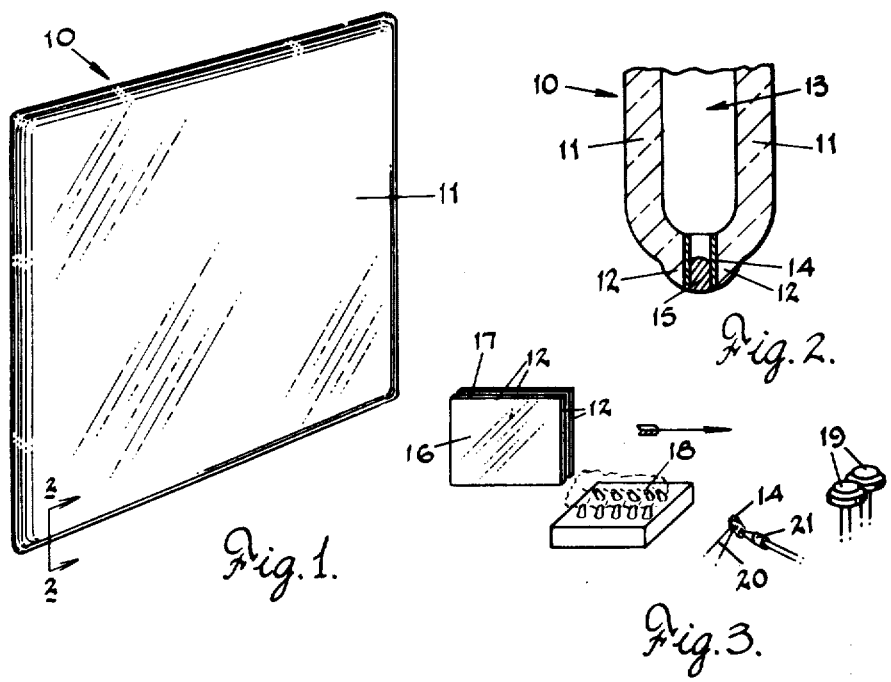
Fig. 1.
Fig. 2.
Fig. 3.
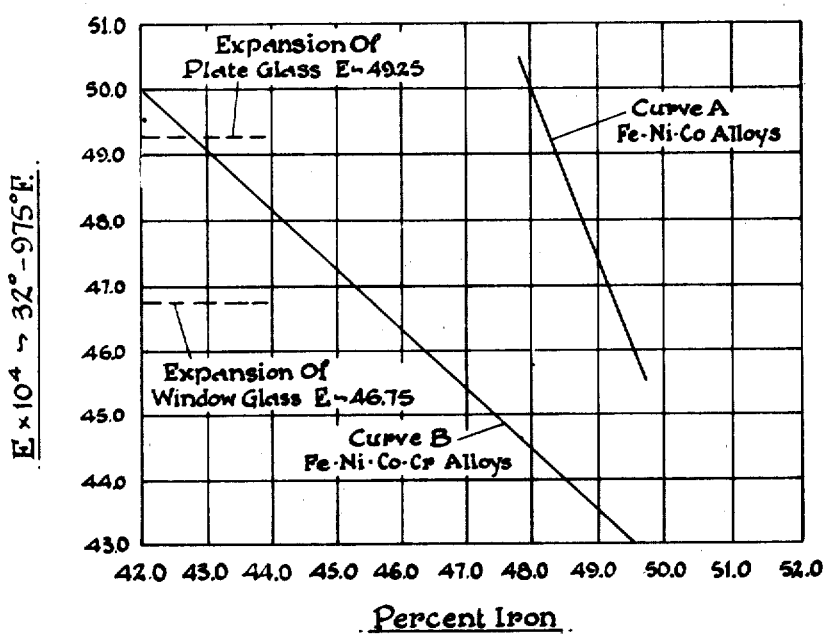
Fig. 4.
INVENTORS
Glen J. Lehr and
BY Alfred E. Badger
Hobbe & Swope
ATTORNEYS

United States Patent Office 3,394,512
Patented July 30, 1968

3,394,512
MULTIPLE SHEET GLAZING UNIT
Glen J. Lehr, Oregon, and Alfred E. Badger, Maumee, Ohio, assignors to Libbey-Owens-Ford Glass Company, Toledo, Ohio, a corporation of Ohio
Filed Dec. 30, 1965, Ser. No. 517,728
8 Claims. (Cl. 52—304)

ABSTRACT OF THE DISCLOSURE

An apertured, iron alloy insert fused into the edge wall of an all-glass multiple sheet glazing unit. Equations are given relating the iron content of the insert to the linear thermal expansion of the glass for both iron-nickel-cobalt and iron-nickel-cobalt-chromium alloys, making it possible to match the expansion of the insert to that of various types of glass.

---

This invention relates broadly to all-glass multiple sheet glazing units, and more particularly to improved apertured metal inserts in such glazing units.

Multiple sheet glass glazing units of the type with which the invention is concerned generally comprise two or more sheets of glass that are arranged in spaced face-to-face relation and fused to one another entirely around their edge portions to provide a hermetically sealed air space therebetween. Due principally to their insulating and condensation-preventing qualities, such units have been found to be especially valuable for use as windows in buildings, showcases, vehicles and the like, In order to produce a multiple sheet glass glazing unit having the deired heat insulating and condensation-preventing qualities, one important step is the dehydration of the space between the glass sheets. This is conventionally performed by flushing out the normally moisture-containing air from the interior of the unit and introducing dry air or gas under pressure therein. The procedure may be expedited by partially evacuating the interior of the unit before introducing the dry gas or air.

In order to remove the humid air from the enclosed space and supply dry air therefor after the sheets have been sealed together, it is necessary to provide an access or dehydration opening to this space. Also, after the space has been dehydrated the necessity arises to hermetically seal the opening in order to maintain the dehydrated condition of the unit.

A number of different ways of providing access openings to the enclosed space between the glass sheets have been devised. For example, the access opening can be drilled or cut in the face portions of the sheets or formed in an edge wall during fabrication.

Regardless of the location of the dehydration holes in the unit, it is necessary to provide some type of closure that will permanently seal the opening. One method advanced is to seal or fuse into the opening a metallic sleeve-like insert or tube which can subsequently be readily closed by any one of a number of methods well known in the art, such as the application of a solder.

However, in fusing a metal insert into a multiple sheet glazing unit it is extremely important that the thermal expansion characteristics of the metal match the thermal expansion of the glass used in forming the unit. This is because any marked vibration in contraction of the metal and the glass as the unit is cooled to room temperature will tend to result in cracks in the glass around the insert rendering the unit unacceptable for its intended purpose.

Accordingly, it is the primary object of the present invention to provide an improved all-glass multiple sheet glazing unit with a longer effective life.

Another object is to provide alloys for use as inserts in all-glass multiple sheet glazing units which make possibel a more precise correlation between the thermal expansion characteristics of the alloy and the glass.

A further object is to provide alloys for this purpose which make it posssible to approach zero production losses due to cracked seals during the annealing and cooling operations of producing such units.

Other objects and advantages of the invention will become more apparent during the course of the following description when read in connection with the accompanying drawings.

In the drawings, wherein like numerals are employed to designate like parts throughout the same:

FIG. 1 is a perspective view of an all-glass glazing unit produced in accordance with the present invention;

FIG. 2 is a cross-sectional view taken along lines 2—2 of FIG. 1 showing the improved metal insert in place in an edge wall;

FIG. 3 is a diagrammatic view of the different parts of an apparatus for producing an all-glass unit incorporating the insert of the present invention; and FIG. 4 is a graph showing the relation of the percent iron content of selected alloys to the linear thermal expansion of glass.

Referring now particularly to FIGS. 1 and 2 of the drawings, there is illustrated an all-glass multiple sheet glazing unit 10 formed by spaced parallel sheets of glass 11. The marginal edges 12 of the sheets are sealed together to produce a glass-to-glass seal and provide an enclosed air space 13 between the sheets. A passage to the air space between the sheets is provided by a cylindrical metallic insert 14 in which the hollow interior of the insert provides the necesasry access to the space of the glazing unit for dehydrating the same, after which the opening may be closed by a body of solder 15 in order to hermetically seal the unit.

One procedure for forming the all-glass multiple sheet glazing unit is shown diagrammatically in FIG. 3 in which a pair of sheets 16 and 17 is held in spaced face-to-face relationship and carried past fusing burners 18 to progressively heat the marginal edges of the sheets to the softening point of the glass. The edges are then passed between a pair of forming rolls 19 to progressively urge the respective edges towards each other into fusing contact to produce a sealed perimeter or edge wall in the unit.

It is preferable to introduce the insert 14 between the spaced edges of the glass just prior to passing through the forming rolls 19 so that, as the insert moves with the sheets toward and between the forming rolls, the glass edges are fused about the insert to securely seal the insert into the edge wall. Although the insert may be placed into the edge wall without any special preparation, it has been found desirable to coat the outer surface of the insert with a layer of glass (not shown) of substantially the same composition of the glass sheets forming the unit. Furthermore, it has also been desirable to preheat the insert to a condition of "redness" immediately prior to its being placed into the edge wall. For these purposes, the insert is introduced between the spaced sheets just forwardly of the forming rolls by an arm 20 and is heated by a burner 21.

However, in producing units in this way, it is important that the thermal expansion of the metal in the insert closely follow that of the glass, in order to avoid excessive temporary stresses in the glass while the unit is cooling, and to avoid residual stresses in the unit after it reaches room temperature, since any such stresses may crack the seal and so render the unit useless.

Although, in accordance with the present invention, compatible alloys can be provided for glasses and ceramics of various compositions and with a relatively wide range of expansion characteristics, the primary concern here is with conventional plate and window glasses since there are most commonly used in multiple sheet glazing units.

Of course, the expansion characteristics of various compositions of glass are well known and window and plate glass have the following linear thermal expansion through a given temperature range.

For window glass:

$$\Delta L/L \text{ (from } 32°-975° \text{ F.)} = 46.75 \times 10^{-4} \text{ in./in.}$$

For plate glass:

$$\Delta L/L \text{ (from } 32-975° \text{ F.)} = 49.25 \times 10^{-4} \text{ in./in.}$$

The above values for $\Delta L/L$ correspond to mean coefficients of expansion of 49.6 and $52.2 \times 10^{-7}$ in./in./° F. for window glass and plate glass, respectively. For convenience, the values of $\Delta L/L$ (32°–975° F.) will be referred to as the thermal expansion (E). Thus, the invention is primarily concerned with alloys which will produce negligible residual stresses when sealed in glasses of thermal expansions ranging from approximately $E=43.0$ to $E=53.0$, the factor of $10^{-4}$ being understood, because this range covers the commonly used window and plate glasses.

Now it is known in the art that metal inserts formed of an alloy having a combination of essentially iron and nickel will provide limited success in all-glass multiple sheet glazing units. However, the iron-nickel alloys heretofore utilized did not always provide the precise correlation between the thermal expansion characteristics of the alloy and the glass forming the unit necessary to eliminate production losses due to cracked seals that occur during the annealing and cooling cycles.

The present invention stems from the knowledge (1) that the predictability of the thermal expansion characteristics of iron-nickel alloys are greatly affected by the small amounts of residual or trace elements, such as manganese, aluminum, chromium, cobalt, silicon, and copper, which are necessarily present in most commercial metal alloys; (2) that a variation in the amount of chromium and/or cobalt in the alloy will have a substantial effect in changing its thermal expansion; and (3) that the presence of cobalt and/or chromium in an alloy to be used as a metallic insert acts to improve the adherence of the metal to the glass.

According to the invention, the proper composition of metallic inserts can readily be specified for most commercial glass having a particular composition with known linear thermal expansion characteristics, including the glasses commonly referred to as window and plate glass. More specifically, a precise determination can be made of the amount of iron content needed in an iron-nickel-cobalt or iron-nickel-cobalt-chromium alloy to provide an alloy that will have a thermal expansion curve that substantially matches that of a glass of known composition within a given temperature range.

Briefly stated, this is accomplished by specifying the iron content for an iron, nickel and cobalt alloy with less that one percent trace elements and in which the cobalt content is less than one-third of the nickel content, with the remaining content being nickel plus trace elements. Similarly, the invention can be practiced by specifying the iron content of an alloy consisting of iron, nickel, cobalt and chromium with less than one percent trace elements and in which the percentage of chromium content is substantially one-fourth of the cobalt content, the cobalt content is substanially one-third the nickel content, the iron content is a function of the linear thermal expansion of the glass between given temperatures and the remaining percentage is nickel plus trace elements.

Thus, applicants have discovered experimentally that, by limiting the amount of trace elements and defining the percentage of cobalt or cobalt and chromium in the above alloys, the iron content of the alloy having a thermal expansion matching that of the glass is a function of the linear thermal expansion of the glass which can be expressed by the following empirical equation:

$$\text{Percent Fe} = 66.57 - (3.71 \times 10^3)E$$

in which E is the linear thermal expansion of the glass for the range from approximately 32° to 975° F. when the cobalt composition ranges from 3 to 12% and the remaining percentage of the composition is nickel with less than one percent trace elements.

Likewise, the iron content of an iron-nickel-cobalt chromium alloy having a thermal expansion matching that of the glass given be defined by the following empirical equation:

$$\text{Percent Fe} = 94.73 - (1.053 \times 10^4)E$$

in which E is the linear thermal expansion of the glass for the range from approximately 32° to 975° F, if the cobalt and chromium contents range from 11.5 to 14% and 2.5 to 4%, respectively, and the remaining content is nickel with less than one percent trace elements.

It should be emphasized that, although the chromium and cobalt content are desirable to increase the adherence of the metal to the glass, applicants have also determined that a large amount of chromium will destroy the straight line function of the thermal expansion characteristics of the metal. Stated another way, a large amount of chromium in the alloy may result in a thermal expansion curve which does not match that of the glass throughout a given temperature range which may result in temporary stresses during the cooling operation.

The accuracy of the above equations was verified in the following manner.

A considerable number of glass compositions having values of E ranging from 43.0 to $53.0 \times 10^{-4}$ were prepared by blending suitable mixtures of powdered glasses, followed by melting in crucibles at 2600° F. to provide homogeneous glasses of known thermal expansion (E).

A limited number of varying compositions of alloys consisting chiefly of iron, nickel and cobalt with less than one percent trace elements were analyzed to determine their exact compositions. The thermal expansion of the glass which should match the thermal expansion of the metal was calculated for each of the alloys based on the iron content by use of the above equation.

Each of the experimental alloys was then machined to insert size and the inserts were respectively sealed into one of the glasses of known thermal expansion (E) by immersing the inserts or grommets into the molten glass in a crucible at a furnace temperature of about 2300° F. and then cooling the glass to room temperature. Examination under polarized light of each of the annealed glass slugs with the enclosed sealed-in grommet showed the stress, if any, in the glass around the seal.

The above procedure was repeated until a glass having a known thermal expansion was found to show negnigible stresses for a corresponding grommet of known composition.

As shown in Table I below, the calculated thermal expansion of the glass based on the iron content of the various compositions varied less than two percent from the experimental expansion based on the above tests.

TABLE I

| Composition of Alloy | | | Thermal Expansion (E) | | Diff. in Percent |
|---|---|---|---|---|---|
| Fe | Co | Ni+Trace Elements | Calculated | Experimental | |
| 47.09 | 3.06 | 49.85 | 52.5 | 53.0 | 1.0 |
| 49.26 | 8.04 | 42.70 | 46.7 | 46.5 | 0.4 |
| 49.29 | 3.30 | 47.41 | 46.6 | 46.3 | 0.6 |
| 50.27 | 11.86 | 37.87 | 43.9 | 44.5 | 1.3 |

The above tests were repeated for an iron-nickel-cobalt-chromium alloy having 11.5 to 14% cobalt, 2.5 to 4% chromium and less than one percent trace elements. The calculated and experimental thermal expansions for various metal compositions with known percentages of the major elements is shown in Table II below.

TABLE II

| Composition of Alloy | | | | | Thermal Expansion (E) | | Diff. in Percent |
| --- | --- | --- | --- | --- | --- | --- | --- |
| Fe | Ni | Trace Elements | Co | Cr | Calculated | Experimental | |
| 48.95 | 35.96 | | 12.08 | 3.01 | 43.5 | 43.8 | 0.7 |
| 49.14 | 35.34 | 0.02 | 12.60 | 2.90 | 43.3 | 43.3 | 0.0 |
| 49.00 | 35.91 | 0.08 | 12.02 | 2.99 | 43.4 | 43.5 | 0.2 |
| 49.28 | 35.53 | 0.16 | 12.08 | 2.95 | 43.2 | 43.0 | 0.5 |
| 48.44 | 36.42 | 0.07 | 12.12 | 2.95 | 44.0 | 43.7 | 0.7 |
| 48.42 | 36.55 | 0.01 | 12.08 | 2.94 | 44.0 | 43.8 | 0.4 |
| 47.15 | 37.80 | 0.05 | 12.04 | 2.96 | 45.2 | 45.0 | 0.4 |
| 46.75 | 35.70 | | 13.80 | 3.75 | 45.6 | 45.8 | 0.4 |

As shown in the tables, in each case tested, the experimental glass which showed negligible stresses during cooling had a linear thermal expansion very near the calculated expansion determined by the percent iron of the composition of the insert.

A plot of the relationship of the percent iron and the linear thermal expansion of the glass for the respective metals tested is shown in FIG. 4.

As can readily be appreciated, by using a composition of metal determined from this graph for the inserts of an all-glass multiple sheet glazing unit, a finished unit will be produced having no measurable stress in the glass adjacent the seal. Furthermore, losses due to poorly matched thermal expansion between the glass and the metal with resulting formation of cracks will be eliminated.

It is to be understood that the form of the invention herewith shown and described is to be taken as a preferred embodiment of the same, and that variations in compositions as well as various changes in the shape, size and arrangement of parts may be resorted to without departing from the spirit of the invention.

We claim:

1. In an all-glass multiple sheet glazing unit comprising spaced parallel sheets of glass fused together along their edge portions to enclose a space therebetween and having a passage formed in said unit leading to the space between the glass sheets; and a cylindrical apertured metal insert fused to said glass forming said passage and communicating with said space, said insert consisting of essentially iron, nickel and cobalt with less than one percent trace elements and wherein the percent iron content is variable according to the linear thermal expansion of said glass for the range from 32° to 975° F. and the cobalt content is less than one-third of the nickel content, said iron content being in the range from 47% to 51% when said thermal expansion varies from $43 \times 10^{-4}$ in./in. to $53 \times 10^{-4}$ in./in.

2. In an all-glass multiple sheet glazing unit comprising spaced parallel sheets of glass fused together along their edge portions to enclose a space therebetween and having a passage formed in said unit leading to the space between the glass sheets; and a cylindrical apertured metal insert fused to said glass forming said passage and communicating with said space, said insert consisting chiefly of iron, nickel, cobalt and chromium with less than one percent trace elements and wherein the iron content is variable according to the linear thermal expansion of said glass for the temperature range from 32° to 975° F., the chromium content is substantially one-fourth of the cobalt and the cobalt content substantially one-third of the nickel content, said iron content being in the range from 39% to 49% when said thermal expansion varies from $43 \times 10^{-4}$ in./in. to $53 \times 10^{-4}$ in./in.

3. In an all-glass multiple sheet glazing unit comprising spaced parallel sheets of glass fused together along their edge portions to enclose a space therebetween, a cylindrical apertured metal insert fused to said glass forming a passage communicating with said space, said insert consisting essentially of iron, nickel and cobalt with less than one percent trace elements, wherein the cobalt content is less than one-third of the nickel content and the iron content is a function of the linear thermal expansion of said glass for the temperature range from 32° to 975° F., said iron content being determined by the equation $$\text{Percent Fe} = 66.57 - 3.71 \times 10^3 (E)$$

where E is the linear thermal expansion of said glass.

4. An all-glass multiple sheet glazing unit as defined in claim 3, in which said cobalt content is 3 to 12%.

5. In an all-glass multiple sheet glazing unit comprising spaced parallel sheets of glass fused together along their edge portions to enclose a space therebetween and a cylindrical, apertured metal insert fused to said glass forming a passage communicating with said space, said insert consisting essentially of iron, nickel and cobalt with less than one percent trace elements, the cobalt content being from 3 to 12% and the iron content being determined by the empirical equation $$\text{Percent Fe} = 66.57 - 3.71 \times 10^3 (E)$$

wherein E is the linear thermal expansion of glass in the range from $43 \times 10^{-4}$ in./in. to $53 \times 10^{-4}$ in./in. for a temperature differential from 32° to 975° F.

6. In an all-glass multiple sheet glazing unit comprising spaced parallel sheets of glass fused together along their edge portions to enclose a space therebetween, a cylindrical, apertured metal insert fused to said glass forming a passage communicating with said space, said insert consisting essentially of iron, nickel, cobalt and chromium with less than one percent trace elements, wherein the cobalt content is substantially one-third the nickel content, the chromium content is substantially one-fourth the cobalt and the iron content is a function of the linear thermal expansion of said glass for the temperature range from 32° to 975° F., said iron content being determined by the equation $$\text{Percent Fe} = 94.73 - 1.053 \times 10^4 (E)$$

where E is the linear thermal expansion of said glass.

7. An all-glass multiple sheet glazing unit as defined in claim 6, in which said cobalt content is 11.5 to 14% and said chromium content is 2.5 to 4.0%.

8. In an all-glass multiple sheet glazing unit comprising spaced parallel sheets of glass fused together along their edge portions to enclose a space therebetween and having a passage formed in said unit leading to said space, and a cylindrical, apertured metal insert fused to said glass forming said passage and communicating with said space, said insert consisting essentially of iron, nickel, cobalt and chromium with less than one percent trace elements, said cobalt content being 11.5 to 14% said chromium content being 2.5 to 4.0%, and the iron content being determined by the empirical equation $$\text{Percent Fe} = 94.73 - 1.053 \times 10^4 (E)$$

wherein E is the linear thermal expansion of glass in the range from $43 \times 10^{-4}$ in./in. to $53 \times 10^{-4}$ in./in. for a temperature differential from 32° to 975° F.

References Cited

UNITED STATES PATENTS

| | | | |
|---|---|---|---|
| 2,057,452 | 10/1936 | Scott | 287—189.365 |
| 2,217,421 | 10/1940 | Scott | 313—220 |
| 3,027,607 | 4/1962 | Badger et al. | 52—304 |

FRANK L. ABBOTT, *Primary Examiner.*

P. C. FAW, *Assistant Examiner.*